United States Patent [19]

Gerdes

[11] 4,157,766

[45] Jun. 12, 1979

[54] ARRANGEMENT FOR CAP-LIKE CLOSURE COVERS

[75] Inventor: Theodor Gerdes, Langenfeld, Fed. Rep. of Germany

[73] Assignee: Blau KG Fabrik fur Kraftfahrzeugteile, Langenfeld, Fed. Rep. of Germany

[21] Appl. No.: 925,863

[22] Filed: Jul. 18, 1978

[30] Foreign Application Priority Data

Jul. 27, 1977 [DE] Fed. Rep. of Germany ....... 2733860

[51] Int. Cl.² ............................................. B65D 41/16
[52] U.S. Cl. .................................................. 220/306
[58] Field of Search ............... 220/306, 307, DIG. 19; 138/89 A; 215/225, 251, 272

[56] References Cited

U.S. PATENT DOCUMENTS

| 3,628,686 | 12/1971 | Burton | 220/306 |
| 3,871,544 | 3/1975 | Peyser | 220/306 X |
| 3,930,218 | 12/1975 | Hall, Jr. | 220/306 X |

*Primary Examiner*—George T. Hall
*Attorney, Agent, or Firm*—Blanchard, Flynn, Thiel, Boutell & Tanis

[57] ABSTRACT

An arrangement for radially extending partition members insertable in the inside circumference of cap-like closure covers, or a sealing flange edge of a further cover part, comprising the use of strap projections emanating from the lower inside edge of the closure cap spread equidistantly over its circumference inwardly bevelled and rising towards the base of the cap in concentric circle having supports facing subsequently thereto radially against the cap wall for a radial fit mounting relative to the cap wall.

6 Claims, 4 Drawing Figures

U.S. Patent  Jun. 12, 1979  4,157,766
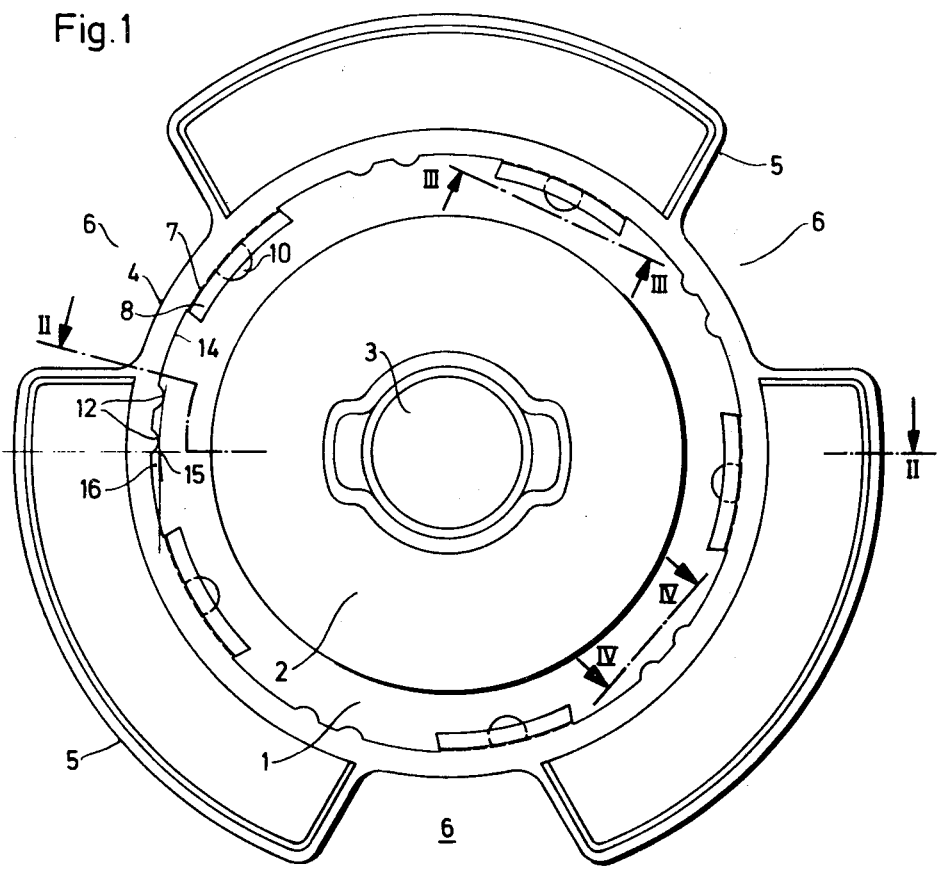
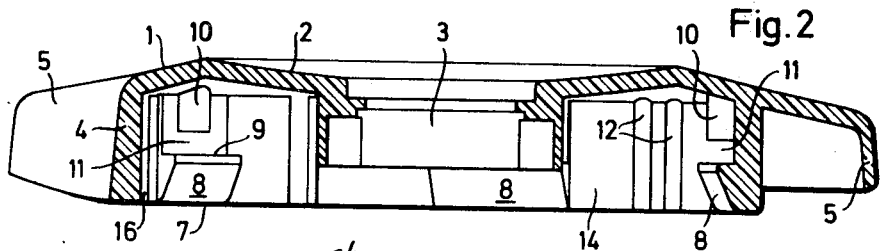
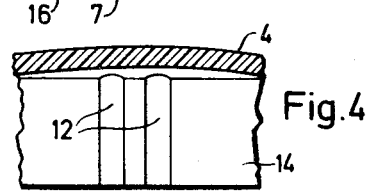
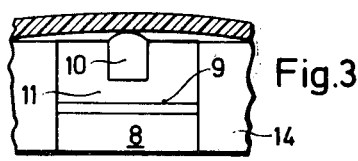

ARRANGEMENT FOR CAP-LIKE CLOSURE COVERS

FIELD OF THE INVENTION

The present invention relates to an arrangement for radially extending partition members or sealing flange edges insertable in cap-shaped closure covers or cover parts mounted in its inside circumference in overlapping cover part for engagement within container or pipe socket openings, for use likewise for closure covers with or without ventilation or pressure compensation devices.

BACKGROUND OF THE INVENTION

For this purpose there are known inner cover parts non-rotatably inserted in the outer cap which are drawn inwardly cup-shaped by means of an angled circumferential flange on the upper cup edge within the drawn down overlapping outer cap and uniformly firmly compressed therewith. Furthermore, the outer cap edge and/or flange edge of the inner cover part may be grooved or corrugated in order in this manner to provide a coupling of the inside closed container or pipe socket outwardly towards the, or below the, cap edge for providing an automatically effective pressure compensation. Also herewith for securing a non-rotatable coupling of both cover parts, additionally one or more projection-like projections for a groove-like engagement in the circumferential edge of the outer cover part may be used in a radial direction.

Furthermore, closure covers are known with partition members firmly inserted in the inside circumference, which in turn may also have automatically controlling pressure compensation devices, in that in apertures of the partition member, separately of one another, valve members acting oppositely for pressure or vacuum compensation open automatically against spring force and close outwardly with recoil, and whereby the outer cap with the inside cover part and interposed partition member are mutually firmly compressed over their circumference. In deviation therefrom finally it is also known (G-OS 25 02 895.2-23), for the partition member to be firmly pressed shut within a screw cap by means of resilient strap parts projecting radially over its circumferential edge and to be firmly pressed in against the cap wall.

It is an object of the present invention to provide a simplification for external closure caps with insertable partition members or uniformly compressible inside cover parts, or alternately made storable twisted relative to one another, also unsable for closure covers with or without pressure compensation, or with locking cylinder safeguard or even for non-lockable caps.

The invention is characterised in this connection by the use of strap projections emanating from the lower inside edge of the closure cap spread equidistantly over its circumference, inwardly bevelled and rising towards the cap base in a concentric circle with sealing abutments radially facing the cap wall for radially resiliently engaging spring fit mountings relative to the cap wall for the insertion of partition members or a sealing flange edge of inside cap members insertable in the outer cap.

The arrangement in accordance with the invention is further characterised by the feature that the outer closure cap materially and in shape is formed somewhat resilient yielding all around in a radial direction for insertion under pressure force against part abutting against inwardly bevelled converging corresponding radially expanding strap projections.

The advantage of the arrangements in accordance with the invention is to be seen in that optionally insert members are to be inserted within the externally overlapping cap with correspondingly adapted circumferential edge, merely against the bevelled surface projections serving for the insertion, so that subject to pressure force, then the axially insertable cap edge is slightly expanded resiliently in order to engage in spring fit in the inwardly facing abutments radially against the cap edge as closure with simultaneously recoiling cap edge. A further advantage of the invention is to be seen in that herewith the given insert member is to be mounted within the outer cap optionally firmly coupled into a unit, or on the other hand may be mounted rotatably retained opposite the inside wall of the outer cap.

BRIEF DESCRIPTION OF THE DRAWINGS

The present invention will be further illustrated, by way of example, with reference to the accompanying drawings in which:

FIG. 1 is a plan view from below of a cap interior incorporating an arrangement in accordance with the invention;

FIG. 2 is a cross-section thereof taken on the line II—II of FIG. 1;

FIG. 3 shows a partial section taken on the line III—III of FIG. 1; and

FIG. 4 is a fragmentary section taken on the line IV—IV of FIG. 1.

DETAILED DESCRIPTION

FIGS. 1 and 2 show a cap-shaped cover part 1 having a slightly arched part 2 spherical towards the centre of its upper surface serving as a cap base and having a central aperture 3 for inserting a conventional cylinder lock therein. This cap 1 moveover is fashioned drawn down and angled at the outer circumference 4 and spread over its circumference are three radially projecting edge members 5 each with spaces 6 for convenient grip for twisting movements of the closure cap 1.

In accordance with the invention, this cap 1 now has in the inside of its edge member 4, outwardly drawn down and overlapping its edge circumference, inwardly bevelled strap projections 8, emanating from its edge circumference towards the cap base 2 and spread equidistantly over its circumference, and upwardly sealing abutment surfaces 9 radially aligned against the cap wall 14 for the parts insertable in the cap interior opposite the base member 2 thereof. The cap 1, with edge member 4, moreover, with regard to material thickness and shaping, is so formed that over its circumference it is somewhat yielding all around at the lower edge 7 so that when introducing the part to be inserted with correspondingly dimensioned circumferential edging from the lower edge 7 of the cap, it is expanded to some extent all around against the bevelled cam projections 8 with correspondingly applied pressure until the insert member then snaps into the abutment surfaces 9 facing radially inwards towards the cap wall over its whole circumference with simultaneously recoiling cap edge member 4. The part to be inserted in the cap—either an inner, cup-shaped, drawn-in cover member or optionally correspondingly shaped partition member for purposes introduced initially in accordance with older patents, according to the invention is mounted in a spring fit mounting relative to the inside wall 14 of the cap edge 4 with abutment all around the radially inwardly facing surfaces 9 of the cam projections 8, and is firmly assembled into a unit axially against the cap base 1. In an expediently further configuration, it is also possible to provide projections 10 with vertical spacing over the radially projecting abutment surfaces 9 on the cap wall 14 as illustrated in fragmentary section in FIG. 3 parts inserted therebetween with resilient spring fit at 11.

Furthermore, slightly projecting rib-like shoulders 12 may be arranged on the inside wall 14 of the cap member 4 spread equidistantly over its circumference, which in turn retain the part to be inserted, centered and rotatable relative to the outer cap 1, or otherwise create spaces 16 as connection outwardly beneath the cap edge 7 for compensating the inner pressure or vacuum when using devices know per se in the closure cover, such as also have been stated initially in the prior art.

On the other hand, these rib shoulders 12, in turn, may be used as additional safeguards for non-rotatably insertable members in that their outer circumference, by means of stepped members, engage between two ribs 12 projecting with slight spacing on the inside wall 14, thus are retained non-rotatable relative to the inside wall 14 of the cap edge 4, as shown in the fragmentary section of FIG. 4.

The expandable cap 1 resiliently yielding all around in a radial direction having strap abutments 8/9 located on its inside wall 14 or additionally radially aligned shoulders 10 or also ribs 12, may preferably be made of a plastics material, but may accordingly also be of metal.

What I claim is:

1. An arrangement for radially extending partition members insertable in the inside circumference of cap-like closure covers, or a sealing flange edge of a further cover part, comprising the use of strap projections emanating from the lower inside edge of the closure cap spread equidistantly over its circumference inwardly bevelled and rising towards the base of the cap in concentric circle having supports facing subsequently thereto radially against the cap wall for a radial fit mounting relative to the cap wall.

2. An arrangement as claimed in claim 1, in which projections on the cap wall radially aligned with vertical spacing over the abutment surfaces are used as axial defining for engaging spring fit in the space.

3. An arrangement as claimed in claim 1 or 2, in which on the cap wall spaced equidistantly over its circumference, slightly projecting rib-like shoulders rotatably retain the outer circumference of the inserted part centrically having spaces towards the cap wall as connection outwardly below the cap edge.

4. An arrangement as claimed in claim 1 or 2, in which the outer circumference of the insert member by means of a stepped projecting part in non-rotatable connection, engages radially between two spaced juxtaposed shoulders of the cap wall.

5. An arrangement as claimed in any preceding claim, in which a closure cap, with regard to material and its shape is adapted all around cushioned somewhat resilient for the introduction of a part to be inserted against the strap projections extending under pressure to extend outwardly bevelled accordingly radially opened out.

6. An arrangement as claimed in claim 5, in which the closure cap, with the strap projections, mounted on the inside wall or projections or ribs additionally radially aligned, is made of a plastics material.

* * * * *